United States Patent
Kwag et al.

(10) Patent No.: US 9,840,217 B2
(45) Date of Patent: Dec. 12, 2017

(54) IMPACT SENSOR ASSEMBLY FOR ACTIVE HOOD SYSTEM

(71) Applicant: SUNGWOO HITECH CO., LTD., Busan (KR)

(72) Inventors: Youngho Kwag, Suwon (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 15/185,083

(22) Filed: Jun. 17, 2016

(65) Prior Publication Data

US 2017/0174162 A1 Jun. 22, 2017

(30) Foreign Application Priority Data

Dec. 18, 2015 (KR) .................. 10-2015-0181669

(51) Int. Cl.
| | |
|---|---|
| *B60R 19/48* | (2006.01) |
| *B60R 21/38* | (2011.01) |
| *B60R 21/0136* | (2006.01) |

(52) U.S. Cl.
CPC ........ *B60R 19/483* (2013.01); *B60R 21/0136* (2013.01); *B60R 21/38* (2013.01)

(58) Field of Classification Search
CPC .... B60R 21/0136; B60R 19/48; B60R 19/483
See application file for complete search history.

(56) References Cited

U.S. PATENT DOCUMENTS

| | | | | |
|---|---|---|---|---|
| 1,658,574 | A * | 2/1928 | Schauman | B60R 19/483 180/279 |
| 5,307,896 | A * | 5/1994 | Taguchi | B60R 21/0136 180/274 |
| 5,680,909 | A * | 10/1997 | Lofy | B60R 21/0136 180/274 |
| 2005/0121925 | A1* | 6/2005 | Federspiel | B60R 21/0136 293/109 |

(Continued)

FOREIGN PATENT DOCUMENTS

| | | | | |
|---|---|---|---|---|
| DE | WO-2006034971 A1 * | 4/2006 | ........... | B60R 19/483 |
| JP | 2006-298321 | 11/2006 | | |

(Continued)

OTHER PUBLICATIONS

Takato et al., Collision Detection Device for Vehicle, JPO, JP 2006-298321 A, Machine Translation of Description.*

(Continued)

*Primary Examiner* — James A English
(74) *Attorney, Agent, or Firm* — Lex IP Meister, PLLC

(57) ABSTRACT

An impact detecting sensor assembly for an active hood system is disclosed. An impact detecting sensor assembly for an active hood system that is disposed at a front bumper of a vehicle, detects an impact force when a vehicle collides with a pedestrian, and controls the active hood system depending on the detection signal according to an exemplary embodiment of the present invention may include i) a flexible holder of a tube shape that is fixed on a front surface of a bumper beam of the front bumper in a vehicle width direction, and ii) a pair of electrode plates that are disposed in the flexible holder at a predetermined interval to face each other.

1 Claim, 9 Drawing Sheets

(56) References Cited

U.S. PATENT DOCUMENTS

| | | | |
|---|---|---|---|
| 2005/0193828 A1* | 9/2005 | Morikawa | B60N 2/002 |
| | | | 73/777 |
| 2015/0137494 A1 | 5/2015 | Le et al. | |
| 2015/0142271 A1* | 5/2015 | Cuddihy | B60R 19/16 |
| | | | 701/45 |

FOREIGN PATENT DOCUMENTS

| | | |
|---|---|---|
| JP | 2012-086688 | 5/2012 |
| KR | 10-2007-0053631 | 5/2007 |
| KR | 10-2014-0023048 | 2/2014 |

OTHER PUBLICATIONS

Ishizaki et al., Deformed State Monitoring Device, JPO, JP 2012-086688 A, Machine Translation of Description.*

Mitterer et al., Sensor Assembly and Method for Locating a Sensor in a Vehicle, EPO, WO 2006/034971 A1, Machine Translation of Description.*

* cited by examiner

IMPACT SENSOR ASSEMBLY FOR ACTIVE HOOD SYSTEM

CROSS-REFERENCE TO RELATED APPLICATION

This application claims priority to and the benefit of Korean Patent Application No. 10-2015-0181669 filed in the Korean Intellectual Property Office on Dec. 18, 2015, the entire contents of which are incorporated herein by reference.

BACKGROUND OF THE INVENTION (a) Field of the Invention

An exemplary embodiment of the present invention relates to an active hood system of a vehicle. More particularly, the present invention relates to an impact detecting sensor assembly for an active hood system that detects an impact with a pedestrian so as to control an operation that raises a hood when a vehicle collides with the pedestrian.

(b) Description of the Related Art

Generally, an engine compartment is provided at a front portion of a vehicle, and the engine compartment is opened or closed by a hood. The hood of the vehicle opens or closes the engine compartment and also covers the engine compartment to muffle engine noise. Both sides of a rear end portion of the hood are engaged with a vehicle body of an upper portion of an engine compartment through a hood hinge assembly, and the hood rotates based on the hood hinge assembly to open or close the engine compartment.

Recently, investigations for a vehicle structure and a safety apparatus are being actively conducted in advanced countries to consider safety of a driver as well as safety of a pedestrian. When a vehicle collides with a pedestrian, if a predetermined distance between a hood and components (engine, etc.) is secured, the hood can absorb impact when a head of a pedestrian collides with the hood. However, in a case that the distance between the hood and the components is not sufficient, the head of a pedestrian collides with the hood and other components to be seriously injured.

By considering this point, in recent years, when a pedestrian collides with a vehicle, an actuator operation forcibly raises a rear end portion of a hood to absorb an impact of a pedestrian and simultaneously reduce an injury level by acting as an active hood system.

In this active hood system, it has to accurately determine whether a vehicle collides with a pedestrian, and for this purpose, it has to detect which part of a bumper collides with a pedestrian and determine whether an active hood system is operated.

The active hood system for this purpose includes an impact detecting sensor that detects a position where a pedestrian collides with a front bumper and an impact level thereof. An impact detecting sensor of an active hood system is disposed between an energy absorber of a front bumper and a bumper beam to detect an impact force when a vehicle collides with a pedestrian.

Accordingly, when a front bumper collides with a pedestrian, if an impact detecting sensor detects the collision, an active hood system is operated by an actuator of an electronic control unit and raises a rear end portion of a hood depending on a detection signal of the impact detecting sensor to secure a shock absorbing space between the hood and the engine compartment.

An impact detecting sensor of an active hood system according to a conventional art is disclosed in Korea Patent Laid-Open Publication No. 2014-0023048. An impact detecting sensor of an active hood system of this conventional art includes an optical fiber sensor and a membrane switch between a front element and a rear element that are disposed at a front surface of a bumper beam.

However, the impact detecting sensor of an active hood system according to a conventional art applies an optical fiber sensor and a membrane switch, and their cost is high and a complicated production process is necessary.

Also, an impact detecting sensor of an active hood system according to a conventional art is fabricated to correspond to various shapes of bumper beams, which is disadvantageous in terms of design freedom, continuous production is impossible, and it is disadvantageous in terms of production cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an impact detecting sensor assembly for an active hood system having a simple structure and being commonly applied to various shapes of bumper beams.

An impact detecting sensor assembly for an active hood system that is disposed at a front bumper of a vehicle, detects an impact force when a vehicle collides with a pedestrian, and controls the active hood system depending on the detection signal according to an exemplary embodiment of the present invention may include i) a flexible holder of a tube shape that is fixed on a front surface of a bumper beam of the front bumper in a vehicle width direction, and ii) a pair of electrode plates that are disposed in the flexible holder at a predetermined interval to face each other.

The flexible holder and the electrode plate may be flexibly bent along the shape of the bumper beam, and are fixed to the beam.

The flexible holder may be made of a flexible rubber material.

The electrode plate may be fixed at the flexible holder by insert injection molding.

The flexible holder may include a first part having a plane plate shape that supports a front surface of the bumper beam and fixes one of the electrode plates, and a second part having a round shape and that is integrally connected to the first part and fixes the other of the electrode plates.

A first support end may be formed at the first part to support an upper end and a lower end of one electrode plate, and a second support end may be formed at the second part to support an upper end and a lower end of the other electrode plate.

The flexible holder may include a finishing member that covers both ends thereof, and wiring is disposed in the finishing member to be electrically connected to the electrode plate.

A plurality of contact protrusions may be formed on at least one of the electrode plates to protrude toward the neighboring electrode plate.

Wiring is disposed in one of the finishing members to be electrically connected to the electrode plate.

A plurality of contact protrusions may be formed on at least one of the electrode plates to protrude toward the neighboring electrode plate.

An impact detecting sensor assembly for an active hood system that is disposed at a front bumper of a vehicle, detects an impact force when a vehicle collides with a pedestrian, and controls the active hood system depending on the detection signal according to an exemplary embodiment of the present invention may include i) a flexible holder that is fixed on a front surface of a bumper beam of the front bumper in a vehicle width direction, ii) a pair of electrode plates that are disposed in the flexible holder at a predetermined interval to face each other, and iii) a mounting unit that is used to fix the flexible holder on the front surface of the bumper beam.

The mounting unit may include a rail member that is fixed on a front surface of the bumper beam to extend in a vehicle width direction and with which the flexible holder is slidably engaged.

The rail member may include a rail main body that is joined to a front surface of the bumper beam to extend in a vehicle width direction, and a support rail that is formed at an upper end and a lower end of the rail main body to support an upper end and a lower end of the flexible holder.

The flexible holder may form a flange portion that is respectively extended from an upper end and a lower end thereof.

The mounting unit may include a fastening member that is used to fix the flange portion to a front surface of the bumper beam.

The fastening member may include a bolt that penetrates the flange portion and a front surface of the bumper, a washer that supports the flange portion and a head of the bolt, and a weld nut that is welded to an inner side of a closed section of the bumper beam and is engaged with the bolt.

A first engagement hole may be formed to combine the bolt.

A second engagement hole may be formed on a front surface of the bumper beam to be connected to the first engagement hole and the weld nut.

The mounting unit may include an adhesive so as to fix the flexible holder on the bumper beam.

The adhesive may be coated on the first part.

Exemplary embodiments of the present invention have a simple configuration including a flexible holder and an electrode plate to be able to decrease production cost and realize a simple production process.

Further, in an exemplary embodiment of the present invention, an impact detecting sensor is flexibly bent to be commonly applied to a bumper beam of various shapes having different curvatures, and it is advantageous in terms of design freedom, it enables continuous production, and it is advantageous in terms of production cost.

BRIEF DESCRIPTION OF THE DRAWINGS

The drawings are provided to be referred to in explaining exemplary embodiments of the present invention, and the spirit of the present invention should not be construed to be limited by the accompanying drawings.

DETAILED DESCRIPTION OF THE EMBODIMENTS

Figure 1:
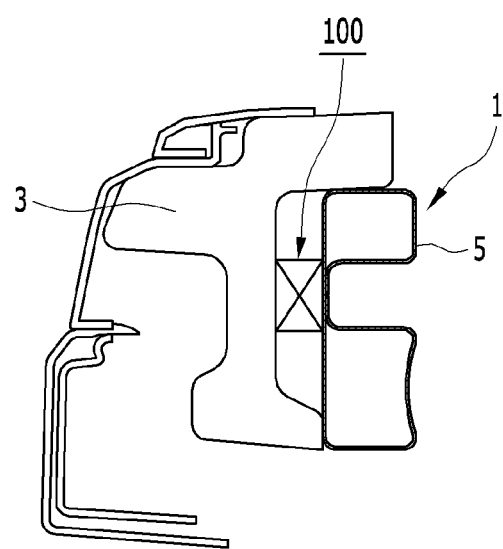
FIG. 1 is a sectional schematic diagram showing a mounting condition of an impact detecting sensor assembly for an active hood system according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

In the drawings, a size and thickness of each element are arbitrarily represented for better understanding and ease of description, the present invention is not limited thereto, and the thickness of layers, films, panels, regions, etc., are exaggerated for clarity.

Further, in order to distinguish constituent elements with the same name, the constituent elements are called first, second, and third elements, and the first, second, and third elements are not limited to an order thereof.

Throughout the specification, unless explicitly described to the contrary, the word "comprise" and variations such as "comprises" or "comprising" will be understood to imply the inclusion of stated elements but not the exclusion of any other elements.

In addition, terms such as " . . . unit", " . . . means", " . . . part", or " . . . member", which are disclosed in the specification, refer to a unit of an inclusive constituent which performs at least one of functions or operations.

FIG. 1 is a sectional schematic diagram showing a mounting condition of an impact detecting sensor assembly for an active hood system according to an exemplary embodiment of the present invention.

Referring to FIG. 1, an active hood system can be applied to an impact detecting sensor assembly 100 for an active hood system according to an exemplary embodiment of the present invention, which raises a rear side of a hood to prevent a secondary impact with an engine component under a hood, when a vehicle collides with a pedestrian.

The active hood system includes the impact detecting sensor assembly 100 and an actuator (not shown) according to an exemplary embodiment of the present invention. Here, the actuator is operated by a detection signal of the impact detecting sensor assembly 100 to be able to raise a rear end portion of the hood (or a hood hinge assembly).

If a collision of a vehicle and a pedestrian is detected by the impact detecting sensor assembly 100, an electronic control unit (ECU) operates the actuator through the detection signal to be able to raise the hood.

The actuator of the active hood system is well known to a person skilled in this art, and the detailed description thereof will be omitted in this specification.

An impact detecting sensor assembly 100 for an active hood system according to an exemplary embodiment of the present invention is disposed between an energy absorber 3 and a bumper beam 5 at a front bumper 1 of a vehicle, and is fixed on a front surface of the bumper beam 5. The bumper beam 5 has at least one closed section, and can be assembled to a front and a rear side member of a vehicle body through a stay (2 of FIG. 2) and a mounting bracket (4 of FIG. 2) of both end sides.

The impact detecting sensor assembly 100 is compressed by impact that is transferred to the energy absorber 3 of the bumper 1, and outputs an electrical signal to the electronic control unit (ECU, when the vehicle collides with a pedestrian.

However, the impact detecting sensor assembly 100 according to the present invention is not limited only to a bumper 1, and it can be applied to various parts that can collide with a pedestrian in a vehicle and can detect impact from the outside.

The impact detecting sensor assembly for an active hood system 100 according to an exemplary embodiment of the present invention has a simple configuration, and can be applied to the bumper beam 5 having various shapes and different curvatures.

For this, the impact detecting sensor assembly for an active hood system 100 according to an exemplary embodiment of the present invention includes a flexible holder 10, and a pair of electrode plates 31 and 32.

Figure 2:
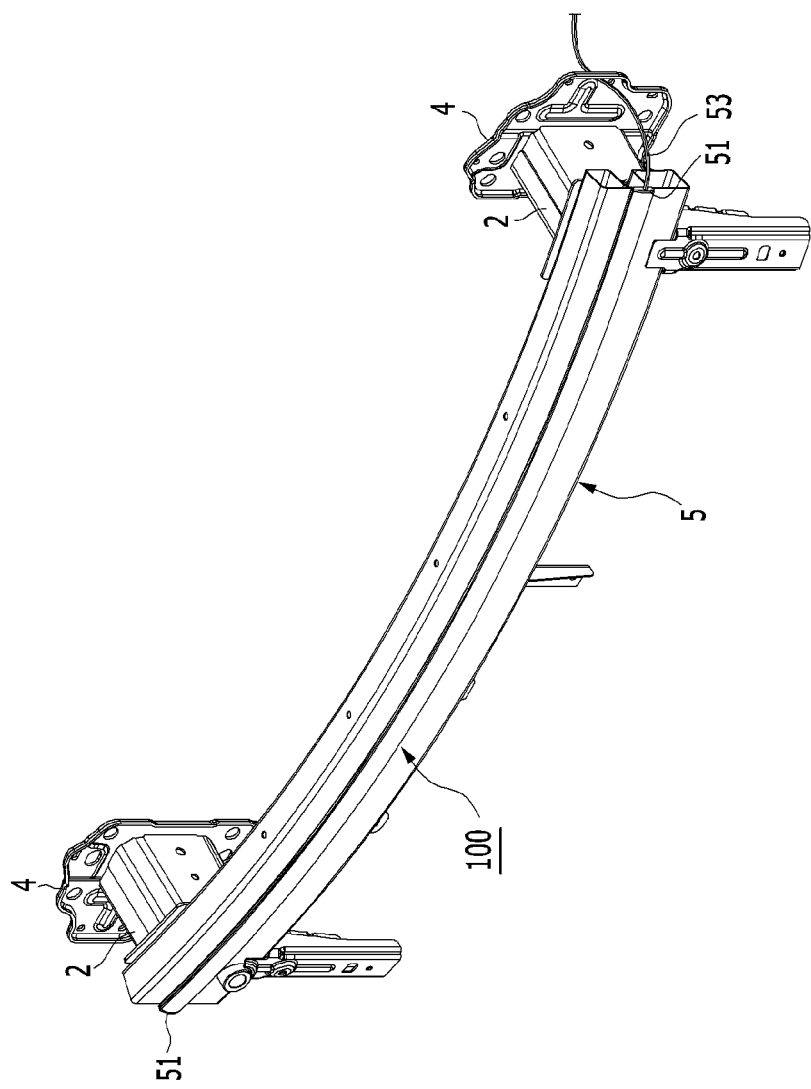
FIG. 2 is a perspective view showing a mounting condition of an impact detecting sensor assembly for an active hood system according to an exemplary embodiment of the present invention.
Figure 3:
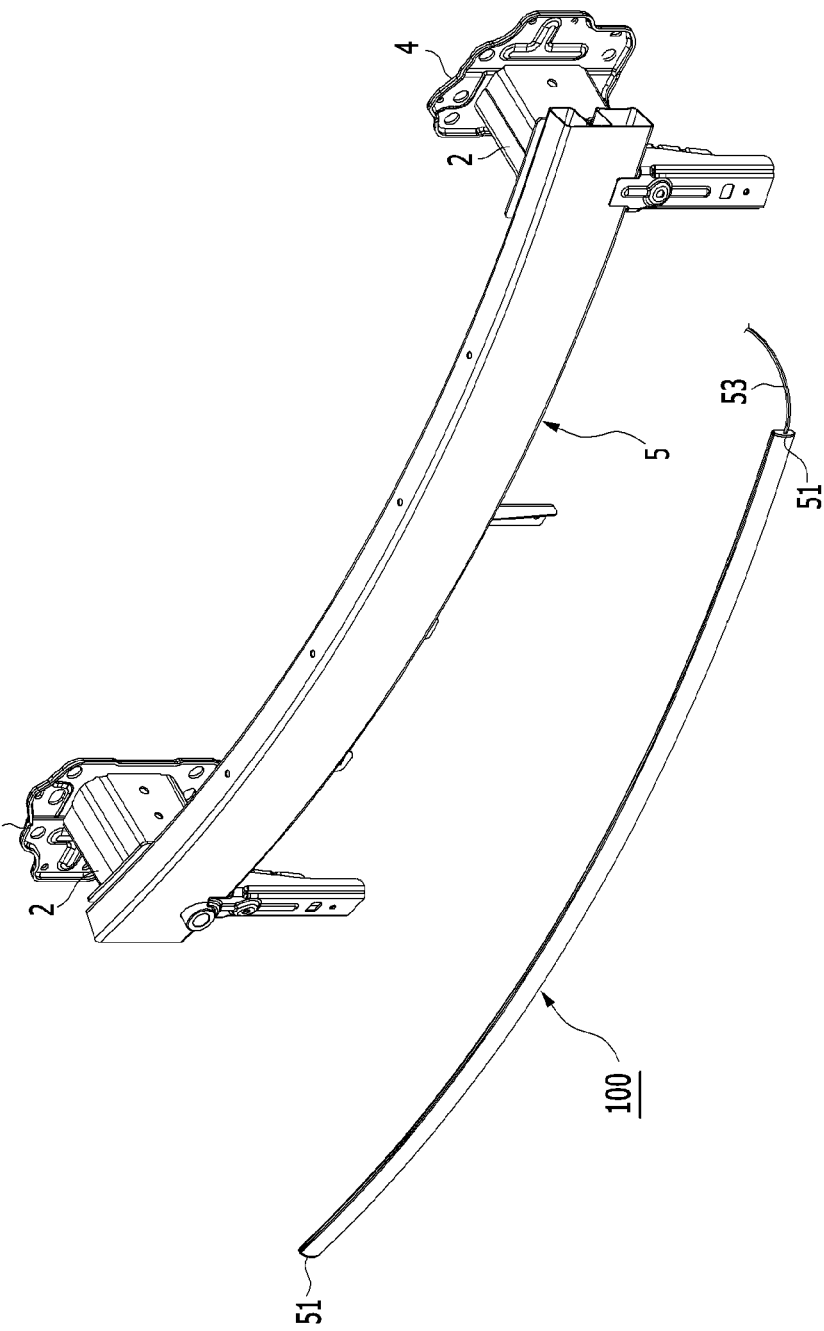
FIG. 3 is an exploded perspective view showing a mounting condition of an impact detecting sensor assembly for an active hood system according to an exemplary embodiment of the present invention.
Figure 4:
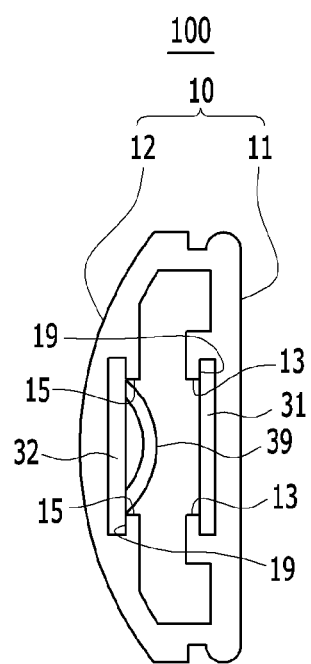
FIG. 4 is a side schematic diagram showing an impact detecting sensor assembly for an active hood system according to an exemplary embodiment of the present invention.
Figure 5:
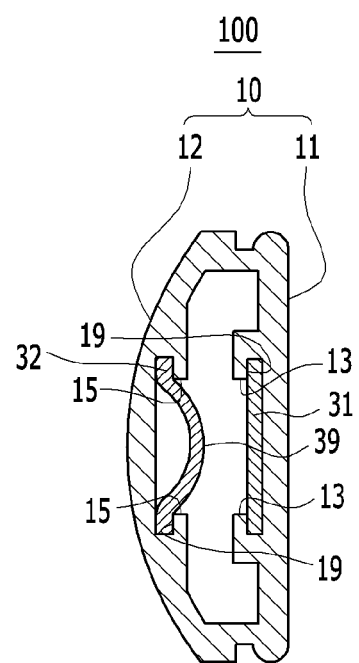
FIG. 5 is a sectional schematic diagram showing an impact detecting sensor assembly for an active hood system according to an exemplary embodiment of the present invention.

FIG. 2 and FIG. 3 are drawings showing a mounting condition of an impact detecting sensor assembly for an active hood system according to an exemplary embodiment of the present invention, and FIG. 4 and FIG. 5 are drawings showing an impact detecting sensor assembly for an active hood system according to an exemplary embodiment of the present invention.

Figure 6:
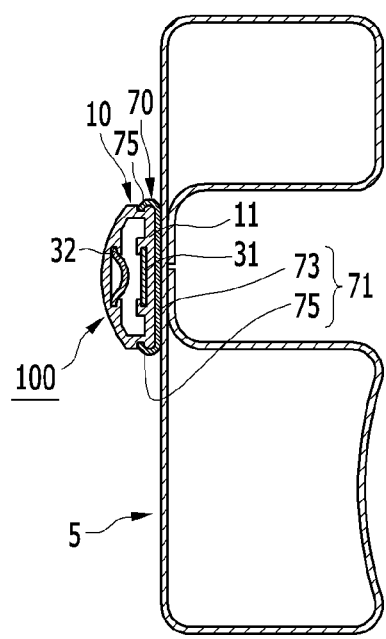
FIG. 6 is a sectional schematic diagram showing a mounting unit part that is applied to an impact detecting sensor assembly for an active hood system according to an exemplary embodiment of the present invention.
Figure 7:
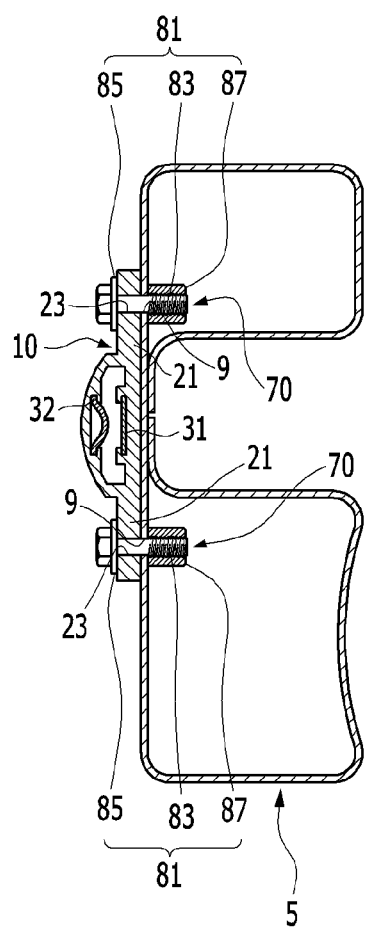
FIG. 7 is a sectional schematic diagram showing a mounting unit part of a first exemplary variation of an impact detecting sensor assembly for an active hood system according to an exemplary embodiment of the present invention.
Figure 8:
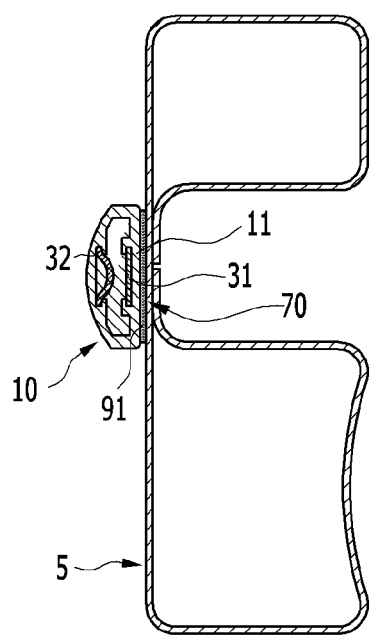
FIG. 8 is a sectional schematic diagram showing a mounting unit part that is applied to an impact detecting sensor assembly for an active hood system according to an exemplary embodiment of the present invention.

Referring to FIG. 2 to FIG. 5, the flexible holder 10 is flexible and is of a tube type of which both ends are opened, and is formed of a rubber material that is flexibly bent along the shape of the bumper beam 5 in an exemplary embodiment of the present invention. The flexible holder 10 is fixed on a front surface of the bumper beam 5 to extend in a vehicle width direction through a mounting unit (70: FIG. 6 to FIG. 8) that will be described later.

The flexible holder 10 includes a first part 11 that supports a front surface of the bumper beam 5 and a second part 12 that is integrally connected with the first part 11 to support the above-mentioned energy absorber 3.

In an exemplary embodiment of the present invention, the pair of electrode plates 31 and 32 are disposed in the flexible holder 10 in a vehicle width direction, and are of a thin plate type that is flexibly bent along the shape of the bumper beam 5.

The pair of electrode plates 31 and 32 are fixed in the flexible holder 10 to face each other at a predetermined interval, and hereinafter, one electrode plate 31 is a first electrode plate and the other electrode plate 32 is a second electrode plate.

The first and second electrode plates 31 and 32 are an anode and a cathode to be respectively electrically connected to a power supply portion (not shown), and they are separated and are disposed to be able to come into contact by an impact force with a pedestrian. The first and second electrode plates 31 and 32 contact each other by an impact force of a pedestrian to be electrically connected with each other, and output an electrical signal to the electronic control unit (ECU).

Here, a gap between the first and second electrode plates 31 and 32 is a factor that determines impact force of a pedestrian, to operate an actuator. The gap can be varied by design specifications and materials of an electrode plate, as well as the impact force that operates the actuator, and thus the gap is not limited to one specific value in an exemplary embodiment of the present invention.

The first and second electrode plates 31 and 32 are insert-injection-molded to be fixed in the flexible holder 10. The first electrode plate 31 is fixed to the first part 11 of the flexible holder 10, and the second electrode plate 32 is fixed to the second part 12 of the flexible holder 10. In this case, one surface of the first and second electrode plates 31 and 32 supports the first and second parts 11 and 12, and the other surface thereof faces it.

A first support end 13 is formed at the first part 11 and supports an upper end portion and a lower end portion of the first electrode plate 31 so as to fix the first and second electrode plates 31 and 32 at the first and second parts 11 and 12 of the flexible holder 10.

Further, a second support end 15 is formed at the second part 12 to support an upper end portion and a lower end portion of the second electrode plate 32. The first and second support ends 13 and 15 form support grooves 19 into which an upper end portion and a lower end portion of the first and second electrode plate 31 and 32 are respectively inserted.

Further, a plurality of contact protrusions 39 are formed on at least one of the first and second electrode plates 31 and 32, for example, on the second electrode plate 32 to which impact force is direct applied, such that the protrusions 39 easily contact the first electrode plate 31 in an exemplary embodiment of the present invention.

The contact protrusions 39 are arranged on the second electrode plate 32 in a vehicle width direction at a predetermined interval to protrude toward the other surface of the neighboring first electrode plate 31. For example, the contact protrusions 39 have a hemisphere shape to convexly protrude toward the other surface of the first electrode plate 31.

In the above, it is described that the contact protrusions 39 are formed on the second electrode plate 32, but it is not limited thereto, and they can be disposed on the first electrode plate 31 and can be respectively disposed on the first and second electrode plates 31 and 32.

The above flexible holder 10 further includes a finishing member 51 to close both ends thereof. A finishing member 51 is inserted into each end of the flexible holder 10 to be fixed thereto, and the members 51 close both ends of the flexible holder 10 and function as a support body.

Here, wiring 53 is disposed at one of the finishing members 51 that are disposed at both ends of the flexible holder 10, and the wiring is electrically connected to one of the first and second electrode plates 31 and 32 and outputs an electrical signal to the electronic control unit (ECU) through contact of the first and second electrode plates 31 and 32.

FIG. 6 is a sectional schematic diagram showing a mounting unit part that is applied to an impact detecting sensor assembly 100 for an active hood system according to an exemplary embodiment of the present invention.

Referring to FIG. 6, an impact detecting sensor assembly for an active hood system according to an exemplary embodiment of the present invention 100 can include a mounting unit 70 for fixing the flexible holder 10, in which the first and second electrode plates 31 and 32 are disposed, on a front surface of the bumper beam 5.

In an exemplary embodiment of the present invention, the mounting unit 70 includes a rail member 71, with which the flexible holder 10 is slidably engaged, and the first and second electrode plates 31 and 32 are disposed in the flexible holder 10.

The rail member 71 is fixed on a front surface of the bumper beam 5 to extend in a vehicle width direction and includes a rail main body 73 and a support rail 75. The rail main body 73 supports the first part 11 of the flexible holder 10 and is welded on a front surface of the bumper beam 5 along a vehicle width direction.

Further, the support rail 75 supports an upper end portion and a lower end portion of the flexible holder 10, and is formed at an upper end portion and a lower end portion of the rail main body 73, for example, the support rail 75 has a shape that is bent at a front side. The support rail 75 is slidably inserted into a groove that is formed at an upper end portion and a lower end portion of the flexible holder 10 to be able to support the upper end portion and the lower end portion of the flexible holder 10.

Accordingly, in an exemplary embodiment of the present invention, the flexible holder 10 is slidably engaged with the rail main body 73 along the support rail 75 of the rail member 71. In this condition, the support rail 75 supports the upper end portion and the lower end portion of the flexible holder 10 along a vehicle width direction and can firmly fix the flexible holder 10.

FIG. 7 is a sectional schematic diagram showing a mounting unit part of a first exemplary variation of an impact detecting sensor assembly for an active hood system according to an exemplary embodiment of the present invention.

Referring to FIG. 7, the mounting unit 70 according to an exemplary embodiment of the present invention has a first exemplary variation such that it can include a fastening member 81 that fixes the upper end portion and the lower end portion of the flexible holder 10, in which the first and second electrode plates 31 and 32 are disposed, to a front surface of the bumper beam 5 through screw fixing.

For this, the flexible holder 10 includes a flange portion 21 that is extended from an upper end and a lower end. The fastening member 81 can fix the flange portion 21 of the flexible holder 10 to a front surface of the bumper beam 5.

The fastening member 81 includes a bolt 83, a washer 85, and a weld nut 87. The bolt 83 is coupled through the flange portion 21 of the flexible holder 10 and a front surface of the bumper beam 5.

Thus, a first engagement hole 23 is formed on the flange portion 21 of the flexible holder 10 to engage the bolt 83. Further, a second engagement hole 9 is formed on a front surface of the bumper beam 5 to be connected to the first engagement hole 23.

The bolt 83 is inserted into the washer 85 to support the flange portion 21 of the flexible holder 10 and a head of the bolt 83.

In addition, the weld nut 87 is welded at an inner side of a closed section of the bumper beam 5 and is engaged with the bolt 83 that is combined with the second engagement hole 9 of the bumper beam 5. The weld nut 87 is welded to an edge of the second engagement hole 9 on a front surface of the closed section of the bumper beam 5 to be connected with the second engagement hole 9 of the bumper beam 5.

Accordingly, in an exemplary embodiment of the present invention, the flexible holder 10 is disposed on a front surface of the bumper beam 5 in a vehicle width direction, the bolt 83 is inserted into the first engagement hole 23 of the flexible holder 10 and the second engagement hole 9 of the bumper beam 5 through the washer 85, and the bolt 83 is engaged with the weld nut 87. Thereby, in an exemplary embodiment of the present invention, a flexible holder 10 where a first and second electrode plate 31 and 32 is provided can be strongly fixed to a front surface of a bumper beam 5 through a fastening member 81.

FIG. 8 is a sectional schematic diagram showing a mounting unit part that is applied to an impact detecting sensor assembly for an active hood system according to an exemplary embodiment of the present invention.

Referring to FIG. 8, the mounting unit 70 according to an exemplary embodiment of the present invention has a second exemplary variation such that it can have an adhesive 91 for attaching the flexible holder 10 on a front surface of the bumper beam 5, and the first and second electrode plates 31 and 32 are disposed in the flexible holder 10.

The adhesive 91 is coated on the first part 11 of the flexible holder 10, and the first part 11 is fixed on a front surface of the bumper beam 5 through the adhesive 91.

Accordingly, in an exemplary embodiment of the present invention, the flexible holder 10 having the first and second electrode plates 31 and 32 can be firmly fixed on a front surface of the bumper beam 5 through the adhesive 91.

Figure 9:
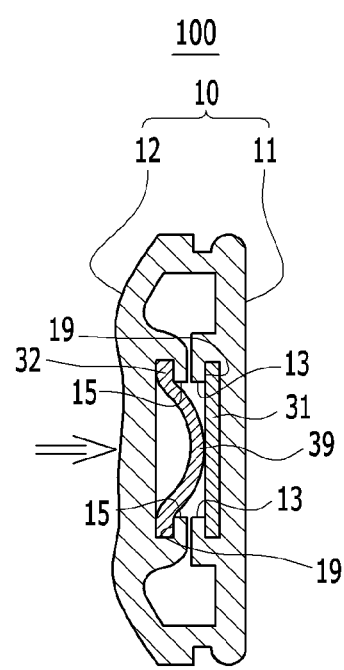
FIG. 9 is a drawing for describing an operation of an impact detecting sensor assembly for an active hood system according to an exemplary embodiment of the present invention.

In an impact detecting sensor assembly 100 for an active hood system that is assembled as described above according to an exemplary embodiment of the present invention, as shown in FIG. 9, an impact force is transferred to the flexible holder 10 through the energy absorber (3: FIG. 1) of the front bumper (1: FIG. 1) when a vehicle crashes.

Thus, the second part 12 of the flexible holder 10 is transformed by the impact force, and the second electrode plate 32 is also moved by the impact force to contact the first electrode plate 31 through the contact protrusions 39.

Hence, the first and second electrode plates 31 and 32 contact each other to be electrically connected and an electrical signal is transmitted to the electronic control unit (ECU) through the wiring 53. Further, the electronic control unit (ECU) receives the electrical signal and transmits an operational signal to the actuator.

Accordingly, an exemplary embodiment of the present invention raises a rear side of a hood through the actuator and can prevent a secondary impact between a pedestrian head and an engine component under the hood.

As described above, an impact detecting sensor assembly 100 for an active hood system according to an exemplary embodiment of the present invention has a simple configuration having a flexible holder 10 and electrode plates 31 and 32 to be able to reduce production cost and to realize a simple production process.

Further, in an exemplary embodiment of the present invention, a flexible holder 10 is flexibly bent and can be commonly applied to a bumper beam 5 of various shapes having different curvatures, and thus it is advantageous in an aspect of design and production cost as it can be continuously fabricated.

That is, in an exemplary embodiment of the present invention, a flexible holder 10 having electrode plates 31 and 32 can be continuously produced by insert-injection-molding, the flexible holder 10 can be easily processed to a desired length, and therefore it is advantageous in an aspect of design and production cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | | | |
|---|---|---|---|
| 1 | front bumper | 3 | energy absorber |
| 5 | bumper beam | 9 | second engagement hole |
| 10 | flexible holder | 11 | first part |
| 12 | second part | 13 | first support end |
| 15 | second support end | 19 | support groove |
| 21 | flange | 23 | first engagement hole |
| 31 | first electrode plate | 32 | second electrode plate |
| 39 | contact protrusion | 51 | finishing member |
| 53 | wiring | 70 | mounting unit |
| 71 | rail member | 73 | rail main body |
| 75 | support rail | 81 | fastening member |
| 83 | bolt | 85 | washer |
| 87 | weld nut | 91 | adhesive |

What is claimed is:

1. An impact detecting sensor assembly for an active hood system that is disposed at a front bumper of a vehicle, detects an impact force when a vehicle collides with a pedestrian, and controls the active hood system depending on the detection signal, comprising:

a flexible holder that is fixed on a front surface of a bumper beam of the front bumper in a vehicle width direction;

a pair of electrode plates that are disposed in the flexible holder at a predetermined interval to face each other; and a mounting unit that is used to fix the flexible holder on the front surface of the bumper beam, wherein the flexible holder is made of a flexible rubber material, the electrode plate is fixed at the flexible holder by insert injection molding, and a plurality of contact protrusions are formed on at least one of the electrode plates to protrude toward the neighboring electrode plate, wherein the mounting unit includes a rail member that is fixed on a front surface of the bumper beam to extend in a vehicle width direction and with which the flexible holder is slidably engaged, wherein the rail member includes:

a rail main body that is joined to a front surface of the bumper beam to extend in a vehicle width direction; and a support rail that is formed at an upper end and a lower end of the rail main body to support an upper end and a lower end of the flexible holder.

\* \* \* \* \*